United States Patent [19]

Stelma

[11] 4,003,271
[45] Jan. 18, 1977

[54] MIRROR ASSEMBLY

[75] Inventor: Gerard N. Stelma, Grand Rapids, Mich.

[73] Assignee: Keeler Brass Company, Grand Rapids, Mich.

[22] Filed: Mar. 14, 1975

[21] Appl. No.: 558,309

[52] U.S. Cl. .............................. 74/501 M; 248/481
[51] Int. Cl.² ............................................ F16C 1/12
[58] Field of Search .................... 74/501 M, 501 R; 248/481

[56] References Cited

UNITED STATES PATENTS 3,780,598  12/1973  Menger .......................... 74/501 R

FOREIGN PATENTS OR APPLICATIONS 1,004,316  9/1965  United Kingdom .............. 248/481

Primary Examiner—Samuel Scott
Assistant Examiner—F. D. Shoemaker
Attorney, Agent, or Firm—Price, Heneveld, Huizenga & Cooper

[57] ABSTRACT

A mirror assembly for vehicles including improved support apparatus for the mirror providing combined pivotal movement about a pair of perpendicular axes and especially adapted to minimize vibration of the mirror and rotation of the mirror in its own plane whereby blurred images are substantially eliminated. The support apparatus includes curved surfaces for supporting and guiding pivotal movement of the mirror. An elongated projection extending from one of the curved surfaces and a corresponding socket receiving the projection and located in the other curved surface include a plurality of cooperating surfaces which minimize and substantially prevent said vibrational, rotational movement. Preferably, the assembly includes remote control wires for pivoting the mirror while the projection and socket have mating shapes of a cross when viewed in cross section.

23 Claims, 9 Drawing Figures

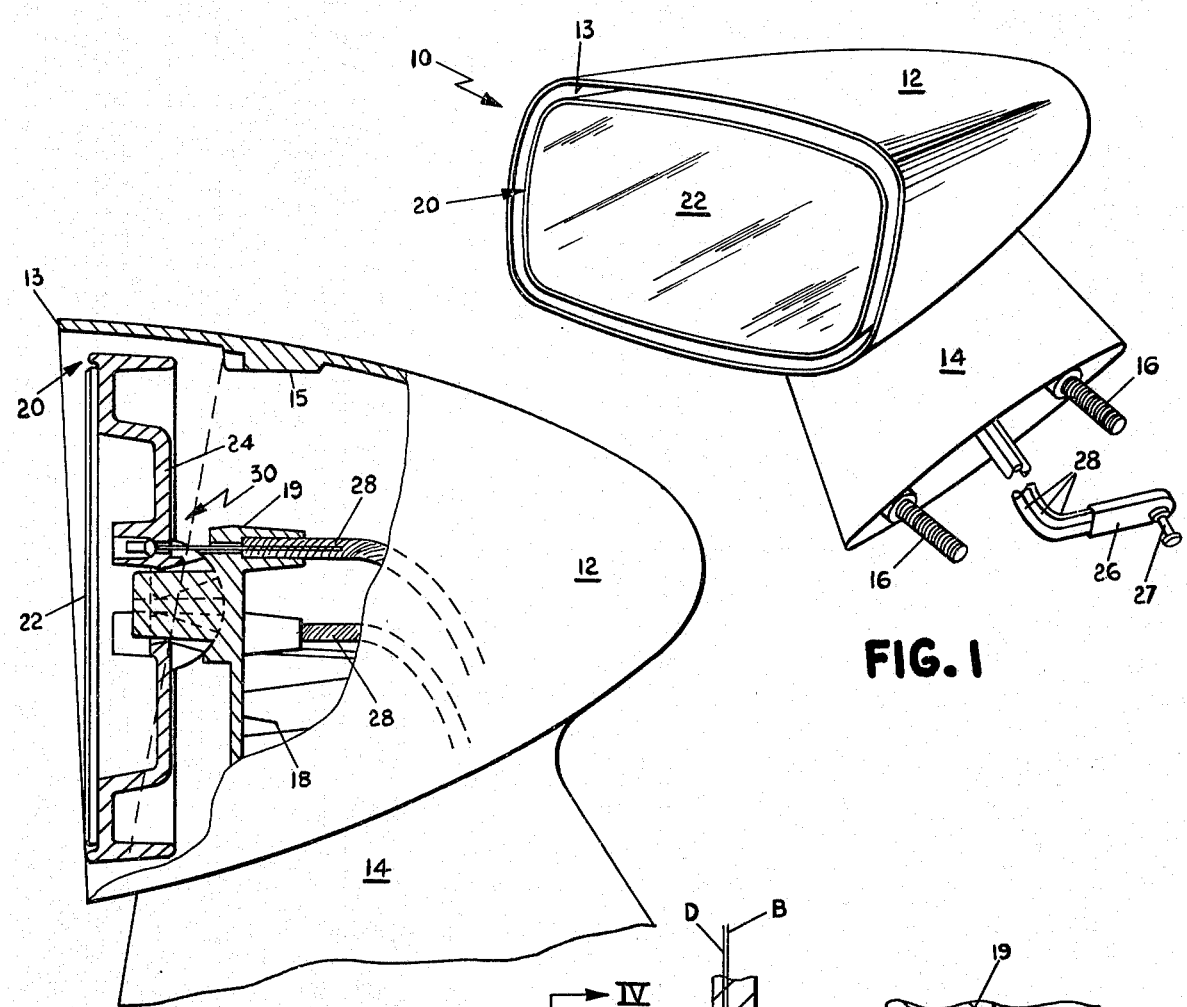
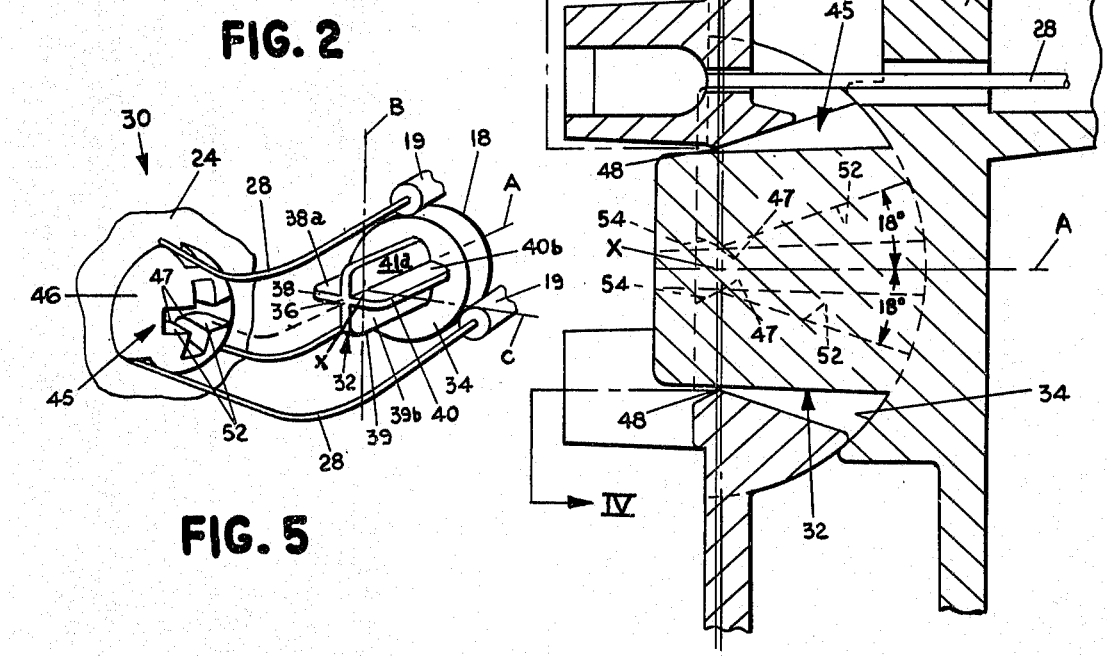

MIRROR ASSEMBLY

BACKGROUND OF THE INVENTION

This invention relates to mirror assemblies for vehicles and, more particularly, to improvements in the support apparatus for mirrors on vehicles which allow pivotal movement of such mirrors but minimize undesirable vibration thereof.

It has long been known to pivotally support a mirror on a base with a ball-and-socket type arrangement. The ball-and-socket joint allows pivotal movement of the mirror to provide a view of the reflected image in various positions.

A major drawback to the use of the basic ball-and-socket arrangement is found in the blurred images resultant when the mirror is supported thereby and subjected to severe vibration. Such conditions exist in prior known vehicular mirrors and are accented and magnified by larger, heavier mirrors required for adequate vision by modern safety standards. In this respect, prior-known mirror assemblies have typically supported a mirror from a central location on its back such that portions of the mirror extend outwardly and laterally in a cantilevered manner, from either side of the support. When subjected to road vibration and the like, such cantilevered support results in a large moment force about the support axis resulting in swinging, vibrational movement generally in the plane of the mirror. Consequently, the image on the mirror surface appears blurred and obstructed and is ofen difficult to use effectively.

Various arrangements have been devised to overcome such vibrational problems including structure supporting the ends of the elongated mirror, or complex, centrally located support apparatus having pivotal contact points spaced well away from the center of the mirror. However, such prior known devices have typically been difficult to adapt for use in remote control assemblies. They further have been complex and expensive to assemble and manufacture, especially for mass-produced mirror assemblies.

SUMMARY OF THE INVENTION

Accordingly, it is an object and purpose of the present invention to provide an improved support or joint apparatus for vehicular mirrors which allows pivotal movement of the mirror yet overcomes, generally minimizes, and substantially eliminates the prior known problem of mirror vibration and mirror rotation in its own plane. The invention includes a pair of mating, curved surfaces which support and guide pivotal movement of the mirror with respect to a base about a predetermined point in a generally ball-and-socket like fashion. A projection extends from one of the curved surfaces and is received in a correspondingly shaped socket on the remaining curved surface. Cooperating surfaces on the projection and socket stop rotation of the mirror generally in its own plane but allow pivotal movement of the mirror for adjustment.

In one aspect, the invention is an improved joint means for pivotally connecting a mirror unit to a base in a mirror assembly for vehicles of the type including a base, a mirror unit including a mirror element and a mirror support engaging the base, and means for holding the mirror unit against the base. The improvement comprises a curved, concave surface on one of the base and mirror units, and a convex, curved surface mating with said concave surface on the other of said base and mirror unit. Socket means are included in one of said concave and convex surfaces for receiving a projection means and a projection means extends from the other of said concave and convex surfaces for insertion in said socket means. The concave and convex surfaces together support and guide pivotal movement of the mirror unit about a point and a pair of coplanar, perpendicular axes intersecting at the point. The socket and projection means together minimize rotational movement of the mirror about a third, predetermined axis which passes through the intersecting point of said perpendicular axes and is generally normal to the plane of said mirror element. Blurring of images on the mirror element due to vibration is thereby substantially eliminated with the improved joint while freedom of pivotal movement is maintained.

In other aspects, the invention comprises a remote control mirror assembly including curved surfaces means and the mating projection and socket means. In the preferred embodiment, the projection has the cross-sectional shape of a cross while the socket has a mating cross-sectional shape.

These and other objects, advantages, purposes, and features of the invention will become more apparent from a study of the following description taken in conjunction with the drawings.

BRIEF DESCRIPTION OF THE DRAWINGS

FIG. 1 is an exterior, perspective view of the preferred remote control mirror assembly of the present invention;

FIG. 2 is a fragmentary, side elevation of the mirror assembly of FIG. 1 with a portion of the housing thereof broken away and showing a central cross-sectional view of the mirror support assembly;

FIG. 3 is an enlarged, fragmentary side section of the support apparatus shown in FIG. 2;

FIG. 5 is a fragmentary, exploded, perspective view of the projection and socket portions of the support apparatus shown in FIGS. 2–4;

DESCRIPTION OF THE PREFERRED EMBODIMENT

Figure 7:
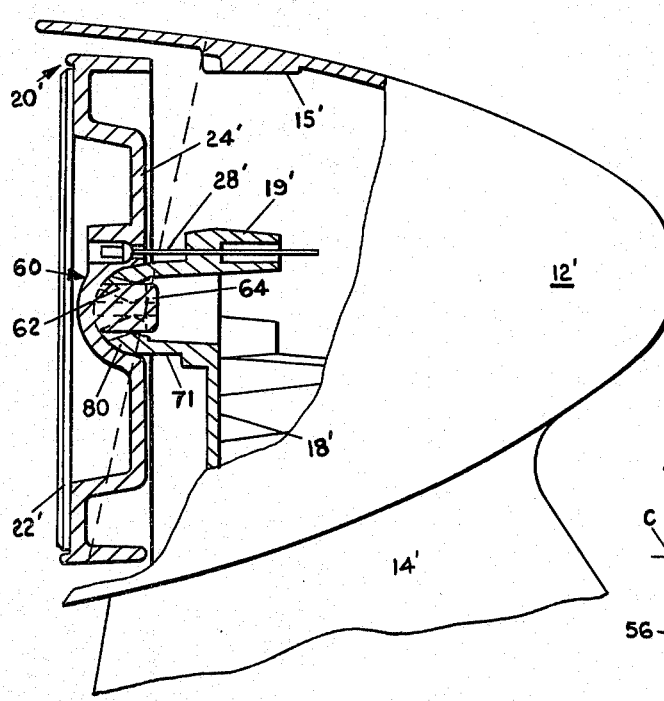
FIG. 7 is a fragmentary, side elevation with portions broken away showing a sectional view of an alternative embodiment of the support apparatus.

Referring now to the drawings in greater detail, FIG. 1 illustrates a preferred embodiment 10 of the remote control mirror assembly of the present invention. The assembly includes an aerodynamically shaped housing 12 having a rearwardly facing opening 13 and an aerodynamically shaped support leg 14 including attaching screws 16 for securing the entire assembly to the exterior of a vehicle. Secured upright within the housing but behind the edge of opening 13 is an upstanding base 18. Pivotally supported on base 18 is a mirror unit 20 including a mirror element 22 having a reflective coating preferably on a rear or second side and a molded, mirror support 24 having peripheral areas 25 to which the mirror element 22 is secured with suitable adhesives or the like. The assembly also preferably includes a conventionally known, Bowden wire control assembly (FIGS. 1 and 2) including a control element 26 mounted within a vehicle. The control assembly is of the conventional type and has a pivotal control lever 27 which operates three shielded cable, control wires 28 extending upwardly through leg 14 into housing 12 where they extend through spaced portions 19 of base 18 into engagement with mirror unit 20. As will be explained more fully below, control wires 28 also serve to hold mirror unit 20 against base 18. Element 26 includes biasing means such as coil springs or the like which pull the wires 28 toward element 26 and constantly urge mirror unit 20 against base 18.

The principal concept of the present invention concerns the pivotal support assembly allowing the pivotal movement of mirror unit 20 with respect to base 18. In the preferred embodiment 30 shown in FIGS. 2–5, the pivot support apparatus is centrally located at the back of the mirror unit and includes an elongated projection 32 having a cross-like, cross-sectional area and extending outwardly along a radius of a spherically shaped, concave, dish-like surface 34 formed on a rearwardly facing surface of base 18. A radius of the spherical curved surface 34 forms a longitudinal axis "A" for the projection (FIGS. 3 and 5). Spherical surface 34 and mating convex spherical surface 46 of socket 45 which receives projection 32 support and guide pivotal movement of the mirror unit while the exterior surfaces of the cross-like projection and the internal surfaces and edges of socket 45 substantially eliminate rotational movement in the plane of the mirror 22.

Projection 32 includes a central portion 36 lying along the longitudinal axis "A" (FIGS. 3 and 5) from which four generally opposing arms 38, 39, 40 and 41 extend outwardly at right angles to one another. Each of the arms 38–41 includes a pair of opposing generally planar surfaces 38a and b through 41a and b (FIGS. 4 and 5), each of these surfaces lying in planes generally parallel to the longitudinal axis "A". Each pair of opposing surfaces 38a and b through 41a and b is spaced apart by the thickness of the arms 38 through 41, respectively. In the preferred embodiment, the surfaces are not strictly parallel to one another but taper slightly at approximately 2° toward one another beginning at the end joining with the spherical surface 34 so that each arm tapers slightly toward its free end. During molding, the slight taper allows the projection 32 to be removed more easily from the mold. Arms 38 and 40 are generally parallel to one another, lie in a common plane, and include one of the two perpendicular axes, axis "B" (FIGS. 4 and 5), about which the mirror unit 20 may be pivoted. The remaining two arms 39 and 41 are also generally parallel to one another and lie in a common plane including the second of the two perpendicular axes, axis "C". Respective pairs of the surfaces of the respective arms lie in common planes—namely, surfaces 38a and 40b, 38b and 40a, 39a and 41b, and 39b and 41a.

Receiving the elongated projection 32 and formed centrally in the mirror support 24 behind the mirror element 22 is a socket 45. Socket 45 is generally centered within a convex, spherically shaped surface 46 formed on the rear of mirror support 24 and is shaped to closely correspond to the shape of the cross-like projection. The socket includes a plurality of opposing, anti-rotation, support edges 47 lying in a common plane "D" therewithin (see FIGS. 3 and 6). Edges 47 are preferably rounded and need not be sharp. In the preferred embodiment, edges 47 include a radius of 0.010 inches. When the projection 32 and socket 45 are assembled, the common plane of the anti-rotation edges is generally transverse to longitudinal axis "A" and is substantially aligned with the common center of generation X of both the spherical concave surface 34 and the spherical convex surface 46. In the preferred embodiment, the plane of edges "D" is slightly offset toward the end of projection 32 about 0.003" from the plane including axes "A", "B", and "C" to help provide the space 49 between edges 47 and arm surfaces as described below.

The socket is shaped such that the anti-rotation edges extend along, are generally parallel to, and are slightly spaced from each of the planar surfaces 38a through 41b on the projection 32. In the preferred embodiment, when the plane "D" including the anti-rotation edges and the plane including axes "B" and "C" are parallel or aligned, i.e., when axis "A" is normal to the plane of mirror 22, the distance between each pair of opposing anti-rotation edges (edges 47 which oppose surfaces 38a and 38b, for example) is approximately three thousandths (0.003) of an inch larger than the thickness of the respective arm of projection 32 fitted therebetween (the arm thickness between surfaces 38a and 38b, for example). Thus, there is a space 49 (shown exaggerated in FIGS. 4 and 6) of about fifteen ten-thousandths (0.0015) of an inch in width between each anti-rotation edge and its opposing projection arm surface when the plane of axes "B" and "C" and edge plane "D" are aligned. Such slight clearance allows room for pivoting the mirror unit 20 about one or both axes "B" and "C" but is not great enough to allow vision blurring vibration or rotation of the mirror unit on the projection.

Figure 4:
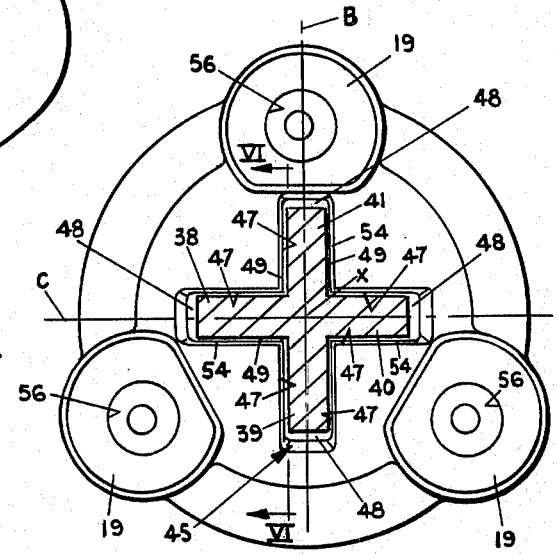
FIG. 4 is a front sectional view of the support apparatus taken along line IV–IV of FIG. 3.

The respective edges 47 and surfaces 38a through 41b are brought into contact with one another as the moment force acting on mirror unit 20 urges rotation in the plane of mirror 22. Such rotation is about axis "A" when plane "D" including edges 47 and th plane including axes "B" and "C" are parallel and is about the axis which is normal to mirror 22 and passes through point X where axes "B" and "C" intersect and which is the center of generation of surfaces 34 and 46 when those planes are not parallel. Hence, rotation of mirror unit 20 in the plane of mirror 22 is stopped by such edge-arm surface contact when the mirror unit is pivoted to any angle of adjustment. The slight .0015 inch spacing 49 is so small that the ultra-small rotation actually allowed is not noticeable to the unaided eye and thus does not blur the image on mirror 22. As unit 20 is pivoted about axes "B" or "C", or a combination thereof, the 0.0015 inch spacing between various of edges 47 and various of the arm surfaces is actually reduced making the edge-arm surface contact tighter and virtually eliminating even the slightest rotation. A greater clearance space 38 is provided between the end surfaces of each of the respective arms of projection 32 and the ends of the respective arm-receiving areas of socket 45 (FIGS. 3 and 4). Such clearance also allows room for pivoting of the mirror unit. Since the antirotational limitation and pivotal support is provided entirely by the opposing anti-rotation edges and arm surfaces and concave and convex spherical surfaces 34, 46, respectively, contact between the ends of the arms and the respective end portions of the sockets is not needed for support or movement limitation.

Figure 6:
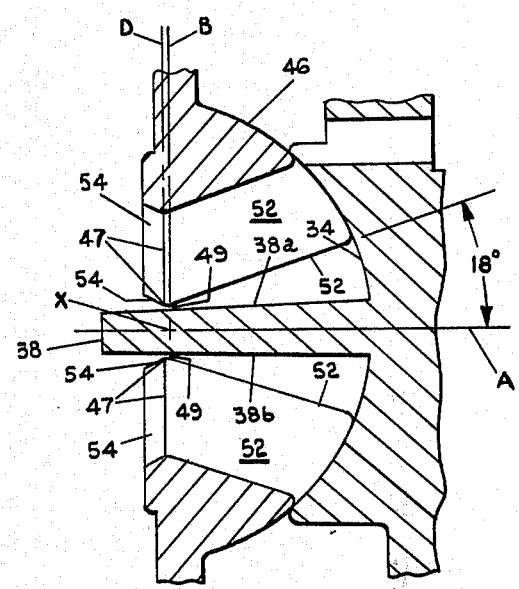
FIG. 6 is an enlarged, fragmentary side section of the support apparatus offset slightly from FIGS. 2 and 3 and taken along plane VI—VI of FIG. 4.

Angling away from each of the anti-rotation support edges 47 are pivot-limiting surfaces 52 and 54 preferably extending at approximately 18° to the longitudinal axis when the "D" plane of the anit-rotation edges is parallel to the plane including the two perpendicular axes "B" and "C" (see FIGS. 3 and 6). Surfaces 52 extend away from edges 47 toward the concave spherical surface 34 while surfaces 54 extend toward the free end of projection 32 from edges 47 and away from that concave surface. The angles of surfaces 52, 54 provide clearance which allows the mirror to move freely in any direction to the maximum desired pivoted positions. In the preferred embodiment, when housing 12 extends around the edge of mirror units 20, the rear edges of the mirror unit actually contacts interior portions of the housing such as shoulder 15 (FIG. 2) before surfaces 52, 54 engage projections 32 as shown by the phantom lines in FIG. 2. However, if no housing was used or if the housing was further spaced from the mirror unit edges, surfaces 52, 54 would stop the pivotal movement of the mirror unit 20 at the indicated angle. The greatest movement of the mirror unit would thus be limited as it is pivoted up, down, or from side to side or combinations thereof about axes "B" and "C" with control wires 28.

As shown in FIGS. 4 and 5, the three Bowden wires 28 extend through spaced portions 19 of base 18 and through a portion of mirror support 24 into sockets 56 spaced equally about the periphery of the socket 45. These wires not only provide a means for remote movement of the mirror unit but retain the convex spherical surface 46 in engagement with and against the corresponding concave spherical surface 34 which surfaces support and guide pivotal movement of the unit about pivot center "X" at the intersection of axes "A", "B", and "C" (FIGS. 3 and 6). The holding force of the control wires or cables is exerted by convex surface 46 against concave surface 34. This force causes a frictional resistance between surfaces 34 and 46 which resists pivotal movement of unit 20 without actuation of lever 27 of control unit 26. This force thus damps vibration movement which would otherwise allow up, down, and side-to-side movement of mirror unit 20 about axes "B" and "C". Further, because surfaces 34, 46 provide primary support for unit 20 with only isolated, occasional rotation preventing contact occurring between edges 47 and the arm surfaces, virtually no wear occurs in the joint on edges 47, surfaces 38–41, or pivot surfaces 34, 46. As established by actual testing, the joint has a life of over 22,000 pivot cycles. This is approximately three to four times the expected pivot cycle life of the Bowden wire control cables used in the preferred embodiment. Should some wear occur on surfaces 34, 46, edges 47 are spaced even closer to the surfaces of arms 38–41 because of the taper of those surfaces as described above. Hence, rotation is even further reduced when wear occurs and vibrational and rotational movement are minimized and substantially eliminated throughout the entire life of the joint.

Accordingly, as will now be appreciated, movement of the control lever 27 extends or retracts one or more of the three Bowden wires 28 causing corresponding pivotal movement of mirror unit 20. Contact between anti-rotation support edges 47 and opposing surfaces 38a and b through 41a and b substantially eliminates rotational movement of the unit. The center of generation "X" of the convex surfaces 46 corresponds to the center of generation for the concave surfaces such that pivotal movement is guided by the mating concave and convex surfaces about the center "X". The mirror unit may be swung through approximately 36° as is governed by the pivot-limiting surfaces 52, 54, i.e., approximately 18° up or down from longitudinal axis "A" about perpendicular axis "C" and approximately 18° toward one side or the other from axis "A" about perpendicular axis "B". Thus, any combination of movement about axes "B" and "C" can be accomplished with the three Bowden wires while annoying vibration and rotational movement is substantially eliminated.

DESCRIPTION OF ALTERNATIVE EMBODIMENT

Figure 9:
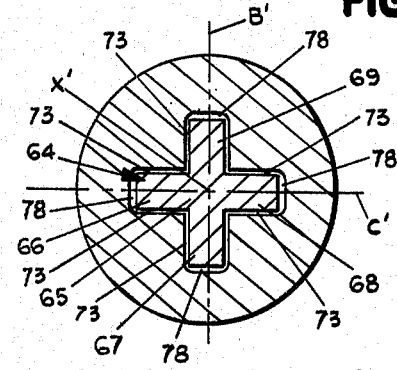
FIG. 9 is a front, sectional view of a portion of the support apparatus taken along plane IX—IX of FIG. 8.
Figure 8:
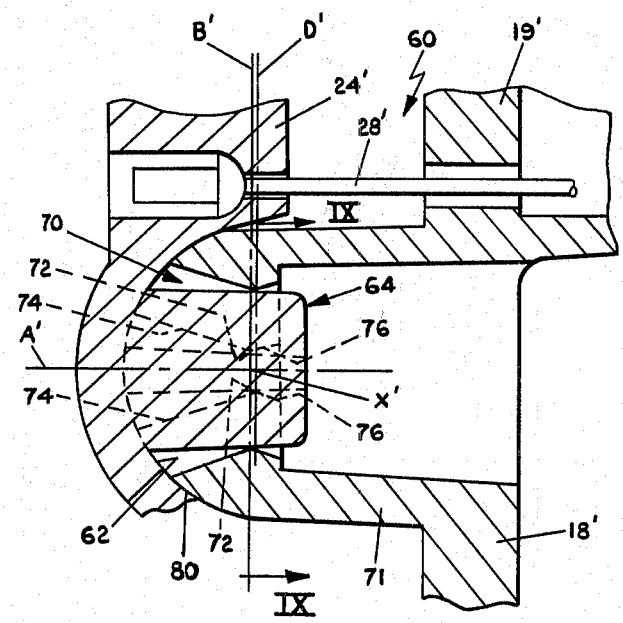
FIG. 8 is an enlarged, fragmentary, side sectional view of the support apparatus shown in FIG. 7.

Referring now to FIGS. 7–9, an alternative embodiment 60 of the pivotal support apparatus is shown. Embodiment 60 is similar to embodiment 30 and is mounted in a similar remote-control mirror assembly including housing 12', support leg 14', upstanding base 18', mirror unit 20', mirror element 22', and mirror support 24'. Three Bowden wires 28' are also included spaced about the support apparatus 60 in base portions 19'. The major difference between embodiments 30 and 60 is that the positions of the projection and socket are reversed, i.e., cross-like projection extends from the back of the mirror unit 20' while the socket is formed in an extending part of the base 18'.

As is best seen in FIGS. 7 and 8, a concave, spherical surface 62 is formed centrally in the rear of mirror support 24' and includes a cross-like projection 64 extending outwardly along a radius thereof. As shown in FIG. 9, the projection includes a central portion 65 and four extending arms 66–69 at right angles to one another in a manner similar to that described for projection 32. The radius of surface 62 provides a longitudinal axis "A'" for projection 64. Arms 66 and 68 extend in opposite directions and lie generally in a common plane including a perpendicular axis "B'" while arms 67 and 69 include the remaining perpendicular axis "C'". Axes "B'" and "C'" are perpendicular to one another and axis "A'" and comprise the axes about which unit 20' is pivoted.

Socket 70, corresponding closely in shape to projection 64, is formed in an extension 71 extending rearwardly from base 18'. Socket 70 is similar in all respects to socket 45 in embodiment 30 including anti-rotational support edges 72 opposing the surfaces of arms 66–69. A space 73 (shown exaggerated in FIG. 9) of about 0.0015 of an inch between each edge 72 and its opposing arm surface is also provided as in embodiment 30 to provide just sufficient room for pivotal movement but to minimize rotational movement. Pivot-limiting surfaces 74 and 76 extend in either direction away from edges 72 at approximately the 18° angle described above with respect to surfaces 52, 54 of embodiment 30. As with embodiment 30, in embodiment 60, shoulder 15' of housing 12' limits pivotal movement of mirror unit 20' before surfaces 74, 76 contact projection 64 (FIG. 7). If housing 12 was not used or spaced further away from the mirror unit, surfaces 72, 74 would limit pivotal movement. Clearances 78 at the ends of the arms 66 through 69 are also provided to allow pivotal movement of the mirrow unit.

The external surface 80 of the end of projection 71 is formed in a convex spherical shape corresponding to the concave spherical shape of surface 62. The plane "D'" (FIG. 8) of the anti-rotational support edges 72 is also generally aligned with the plane including axes "B'" and "C'" and the center of generation "X'" of convex surface 80. However, in the preferred embodiment, a 0.003 inch offset is included to space these planes apart and to help provide spacing 73 because of the preferred taper of the arm surfaces of projection 64. Center "X'" corresponds with the center of generation for spherical, concave surface 62 which also lies on axis "A'". Hence when pivotally moved by Bowden wires 28', the mirror unit 20' including projection 64, pivots about axes "B'" and "C'" as supported and guided by the mating curved surfaces 62 and 80. These surfaces are held in engagement by wires 28' as described for embodiment 30. As with embodiment 30, any moment force attempting to rotate mirror unit 20' in the plane of mirror 22' results in contact between the opposing anti-rotational edges and the surfaces of arms 66 through 69 substantially eliminating the vibration and rotational movement of the mirror unit 20' about an axis normal to the plane of mirror 22' which passes through center "X'".

As will be obvious to those skilled in the art, embodiments 30 and 60 of the mirror support apparatus can be used in mirror assemblies other than of the remote control type. In place of the Bowden wires 28 or 28' which retain the mirror units 20 or 20' against the bases 18 or 18' as described herein, other biasing or restraining members such as coil springs or the like extending between base 18 or 18' and mirror support 24 or 24' could be utilized. The mirror unit 20 could thus be pivoted by hand about axes "B'" and "C'" or "B" and "C" with the biased retention members holding the concave and convex spherical surfaces against one another while the anti-rotational support edges restrict rotational movement about axis "A" or "A'". The rotational and vibrational movement eliminated from the remote control assemblies would thus also be eliminated from the manually pivoted mirror assembly.

Additionally, while it is possible to reverse the positions of the projection and socket as described herein with embodiments 30 and 60, it is also possible to reverse the position of the anti-rotational support edges 47 and 72 and the corresponding opposing surfaces engaged by those support edges. Thus, the socket could include the opposing surfaces while the projection is formed with the anti-rotational edges thereon. Also, the projection could extend from the convex surface while the socket is formed in the concave surface. Such reversal of position for the elements is contemplated within the scope of the claims herein.

Accordingly, the present invention provides a simple, easily assembled and manufactured pivotal mirror support apparatus especially adapted to prevent vibration and rotation of a mirror mounted in a mirror assembly on a vehicle. The combination of the cross-like projection and corresponding socket substantially eliminate rotational movement in the plane of the mirror while mating curved, spherical surfaces support and guide pivotal movement around one or both of two transverse, perpendicular axes and absorb all wear for such pivotal movement. There is substantially no wear or degrading of the anti-rotational edges such that vibration and rotation are prevented during the entire life of the apparatus. While especially adapted for vehicles, it will be apparent that the assembly can be utilized in any structure where vibration and rotation of a mirror element in its own plane must be substantially eliminated.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. In a mirror assembly for vehicles of the type including a base, a mirror unit including a mirror element and a mirror support engaging said base for supporting said mirror element, and means for holding said mirror unit against said base; an improved joint means for pivotally connecting said mirror unit to said base comprising: a curved, concave surface on one of said base and mirror unit; a convex, curved surface mating with said concave surface on the other of said base and mirror unit; socket means in one of said concave and convex surfaces for receiving a projection means; and projection means extending from the other of said concave and convex surfaces for insertion in said socket means; said concave and convex surfaces together supporting and guiding pivotal movement of said mirror unit about a predetermined point and a pair of coplanar, perpendicular axes intersecting at said point; said socket and projections means including adjacent surface means for minimizing rotational movement of said mirror unit about a third, predetermined axis which passes through said point and is generally normal to the plane of said mirror element but allowing pivotal movement of said mirror unit about said point and said pair of coplanar, perpendicular, intersecting axes whereby blurring of images on said mirror element due to vibration is substantially eliminated.

2. In a mirror assembly for vehicles of the type including a base, a mirror unit including a mirror element and a mirror support engaging said base for supporting said mirror element, and means for holding said mirror unit against said base; an improved joint means for pivotally connecting said mirror unit to said base comprising: a curved, concave surface on one of said base and mirror unit; a convex, curved surface mating with said concave surface on the other of said base and mirror unit; socket means in one of said concave and convex surfaces for receiving a projection means; and projection means extending from the other of said concave and convex surfaces for insertion in said socket means; said concave and convex surfaces together supporting and guiding pivotal movement of said mirror unit about a predetermined point and a pair of coplanar, perpendicular axes intersecting at said point; said socket and projection means together minimizing rotational movement of said mirror unit about a third, predetermined axis which passes through said point and is generally normal to the plane of said mirror element whereby blurring of images on said mirror element due to vibration is substantially eliminated; one of said projection and socket means including a plurality of opposing surfaces; the other of said projection and socket means including a plurality of anti-rotational edges located in opposition to said opposing surfaces, each edge positioned adjacent to but slightly spaced from one of said opposing surfaces whereby any rotation of said mirror unit generally in the plane of the mirror about said third axis is stopped by contact between said opposing surfaces and anti-rotational edges.

3. The improvement of claim 2 wherein said projection means includes a longitudinal axis; said opposing surfaces being formed on said projection means and including two sets of surfaces extending at right angles to one another and generally parallel to said longitudinal axis; each set including a pair of opposing surfaces.

4. The improvement of claim 3 wherein said opposing surfaces in one of said sets are parallel to a plane including one of said two perpendicular axes, said opposing surfaces in said other set being parallel to a plane including the other of said perpendicular axes.

5. The improvement of claim 2 wherein said socket means includes said anti-rotational edges, said projection means including said opposing surfaces, said socket means further including pivot-limiting surfaces extending away from said anti-rotational edges on at least one side thereof for alternately contacting said opposing surfaces on said projection means and defining the limit of said pivotal movement about said point and perpendicular axes, each of said pivot-limiting surfaces diverging away from another at a predetermined angle.

6. In a mirror assembly for vehicles of the type including a base, a mirror unit including a mirror element and a mirror support engaging said base for supporting said mirror element, and means for holding said mirror unit against said base; an improved joint means for pivotally connecting said mirror unit to said base comprising: a curved, concave surface on one of said base and mirror unit; a convex, curved surface mating with said concave surface on the other of said base and mirror unit; socket means in one of said concave and convex surfaces for receiving a projection means; and projection means extending from the other of said concave and convex surfaces for insertion in said socket means; said concave and convex surfaces together supporting and guiding pivotal movement of said mirror unit about a predetermined point and a pair of coplanar, perpendicular axes intersecting at said point; said socket and projection means together minimizing rotational movement of said mirror unit about a third, predetermined axis which passes through said point and is generally normal to the plane of said mirror element whereby blurring of images on said mirror element due to vibration is substantially eliminated; said projection means including an elongated projection extending outwardly from said concave surface; said socket means located in said convex surface and including a socket receiving said projection means through said convex surface with said convex surface surrounding said socket, said convex surface seating on said concave surface to support and guide pivotal movement of said mirror unit about said two perpendicular axes in a ball-and-socket like manner while said projection and socket limit rotational movement of said mirror unit about said third axis.

7. The improvement of claim 6 wherein said projection includes a longitudinal axis; both of said concave and convex surfaces being spherical surfaces; said longitudinal axis of said projection being coaxial with a radius of said concave, spherical surface.

8. The improvement of claim 7 wherein said projection includes a plurality of opposing, generally planar surfaces; said socket means including said plurality of anti-rotational support edges which generally lie in a common plane and are each generally parallel to and spaced slightly away from one of said opposing surfaces on said projection means; each of said opposing surfaces being generally parallel to said projection longitudinal axis; said point about which said mirror unit is pivoted being the center of generation of said concave spherical surface and lying on said longitudinal axis of said projection; said plane of said anit-rotational edges being generally aligned with said spherical center of generation.

9. The improvement of claim 6 wherein said concave surface and said projection are formed on said base; said socket and said convex surface being formed on said mirror support and facing said base.

10. The improvement of claim 6 wherein said socket and said convex surface are formed on said base; said concave surface and projection being formed on said mirror support and facing said base.

11. The mirror assembly of claim 6 wherein said means for holding said mirror unit against said base include remote control means having three Bowden control wires spaced equally around said socket means and projection means, said control wires extending through portions of said base and secured to said mirror support for combined movement of said mirror unit about said point and said two perpendicular axes.

12. In a mirror assembly for vehicles of the type including a base, a mirror unit including a mirror element and a mirror support engaging said base for supporting said mirror element, and means for holding said mirror unit against said base; an improved joint means for pivotally connecting said mirror unit to said base comprising: a curved, concave surface on one of said base and mirror unit; a convex, curved surface mating with said concave surface on the other of said base and mirror unit; socket means in one of said concave and convex surfaces for receiving a projection means; and projection means extending from the other of said concave and convex surfaces for insertion in said socket means; said concave and convex surfaces together supporting and guiding pivotal movement of said mirror unit about a predetermined point and a pair of coplanar, perpendicular axes intersecting at said point; said socket and projection means together minimizing rotational movement of said mirror unit about a third, predetermined axis which passes through said point and is generally normal to the plane of said mirror element whereby blurring of images on said mirror element due to vibration is substantially eliminated; said projection means including an elongated projection having a longitudinal axis and the cross-sectional shape of a cross, two sets of opposing arms extending outwardly from a central portion thereof at right angles to one another in perpendicular planes including said perpendicular axes and a plurality of opposing surfaces including a pair of generally parallel and planar surfaces on each of said arms, all of said surfaces extending generally parallel to said longitudinal axis of said projection; said socket means including a plurality of anti-rotational support edges extending in a common plane which intersects said longitudinal axis generally transverse thereto; each of said anti-rotational support edges extending adjacent and generally parallel to but being slightly spaced from one of said surfaces of said arms when said third axis is perpendicular to the plane including said pair of said coplanar, perpendicular axes.

13. The improvement of claim 12 wherein said socket means further includes pivot-limiting surfaces extending away from said anti-rotational edges on at least one side thereof for alternately contacting said opposing surfaces on said projection means and defining the limit of said pivotal movement about said perpendicular axes, each of said pivot-limiting surfaces diverging away from another at a predetermined angle.

14. A remote mirror assembly for vehicles comprising:
an upstanding base;
a mirror unit including a mirror element and a mirror support engaging said base for supporting said mirror element;
remote control means for moving and adjusting the position of said mirror unit from a location remote from said assembly;
pivot support means for pivotal movement of said mirror unit about a predetermined point and a pair of perpendicular axes intersecting at said point; said pivot support means including curved surface means for supporting and guiding pivotal movement of said mirror unit about said point and perpendicular axes; projection means extending from said curved surface means; and socket means for receiving said projection means; said projection means and socket means including adjacent surface means for minimizing rotational movement of said mirror unit about a third, predetermined axis which passes through said point and is generally normal to the plane of said mirror element but allowing pivotal movement of said mirror unit about said point and said pair of perpendicular intersecting axes whereby blurring of images on said mirror element due to vibration is substantially eliminated.

15. A remote mirror assembly for vehicles comprising:
an upstanding base;
a mirror unit including a mirror element and a mirror support engaging said base for supporting said mirror element;
remote control means for moving and adjusting the position of said mirror unit from a location remote from said assembly;
pivot support means for pivotal movement of said mirror unit about a predetermined point and a pair of perpendicular axes intersecting at said point; said pivot support means including curved surface means for supporting and guiding pivotal movement of said mirror unit about said point and perpendicular axes; projection means extending from said curved surface means; and socket means for receiving said projection means; said projection means and socket means minimizing rotational movement of said mirror unit about a third, predetermined axis which passes through said point and is generally normal to the plane of said mirror element whereby blurring of images on said mirror element due to vibration is substantially eliminated;
said curved surface means include a curved, dishlike, concave surface and a convex surface corresponding to said concave surface; said projection means extending outwardly from said concave surface; said socket means being formed in said convex surface with said convex surface surrounding said socket means and seating on said concave surface to support and guide pivotal movement of said mirror unit in a ball and socket-like manner; said remote control means including control wires which hold said concave and convex surfaces against one another.

16. The mirror assembly of claim 15 wherein both of said concave and convex surfaces are spherical surfaces; said projection means having a longitudinal axis which is coaxial with a radius of said concave surface.

17. The mirror assembly of claim 14 wherein said curved surface means include a concave surface and a convex surface corresponding to said concave surface; said projection means including an elongated projection extending from at least one of said concave and convex surfaces which projection includes a plurality of opposing surfaces thereon; said socket means including a socket adapted to mate with said projection and located in the other of said concave and convex surfaces for receiving said projection, said socket including anti-rotational support edges extending along, substantially parallel to, and spaced slightly from said opposing projection surfaces for allowing combined pivotal movement of said mirror unit about said point and said two perpendicular axes but preventing rotational and vibrational movement of said mirror unit about said third axis.

18. The mirror assembly of claim 17 wherein said projection extends from said concave surface, and said socket is formed in said convex surface; said concave surface and projection being formed on said upstanding base; said socket and convex surface being formed on said mirror support facing said base.

19. The mirror assembly of claim 17 wherein said projection extends from said concave surface, and said socket is formed in said convex surface; said socket and convex surface being formed on said upstanding base; said concave surface and projection being formed on said mirror support and facing said base.

20. The mirror assembly of claim 17 wherein said plurality of anti-rotational support edges lie in a common plane which is generally transverse to said longitudinal axis, said point around which said mirror unit is pivoted lying on said longitudinal axis of said projection; said plane of said anti-rotational edges being generally aligned with said point.

21. The mirror assembly of claim 17 wherein said projection extends from said concave surface, and said socket is formed in said convex surface; said opposing surfaces tapering slightly toward one another beginning at said concave surface and extending toward the free end of said projection.

22. The mirror assembly of claim 17 wherein said socket further includes pivot-limiting surfaces extending away from said anti-rotational edges on at least one side thereof for alternately contacting said opposing surfaces on said projection and defining the limit of said pivotal movement about said point and perpendicular axes, each of said pivot-limiting surfaces diverging away from another at a predetermined angle.

23. The mirror assembly of claim 17 wherein said projection has the cross-sectional shape of a cross and two sets of opposing arms extending outwardly from a central portion thereof at right angles to one another in perpendicular planes including said perpendicular axes, said opposing surfaces including a pair of generally parallel and planar surfaces on each of said arms, said pairs of surfaces on each arm of one set extending generally at right angles to those on each arm of the other of said sets, all of said surfaces extending generally parallel to said longitudinal axis of said projection; said plurality of anti-rotational support edges extending in a common plane which intersects said axis generally transverse thereto.

* * * * *